US012442248B1

(12) United States Patent
Lytle

(10) Patent No.: US 12,442,248 B1
(45) Date of Patent: Oct. 14, 2025

(54) LADDER SAFETY SYSTEM

(71) Applicant: Frank Lytle, The Villages, FL (US)

(72) Inventor: Frank Lytle, The Villages, FL (US)

( * ) Notice: Subject to any disclaimer, the term of this patent is extended or adjusted under 35 U.S.C. 154(b) by 0 days.

(21) Appl. No.: 19/072,298

(22) Filed: Mar. 6, 2025

(51) Int. Cl.
*E06C 1/387* (2006.01)
*E06C 7/00* (2006.01)

(52) U.S. Cl.
CPC .............. *E06C 1/387* (2013.01); *E06C 7/006* (2013.01)

(58) Field of Classification Search
CPC .......... E06C 1/005; E06C 1/387; E06C 7/006; E04F 11/04; E04F 11/06; A47B 2220/05; A47B 97/00
See application file for complete search history.

(56) References Cited

U.S. PATENT DOCUMENTS 1,860,294 A * 5/1932 Neusus ..................... E06C 9/08 182/77
4,111,280 A 9/1978 Devine et al.
4,425,984 A 1/1984 Lachance
4,805,736 A * 2/1989 Byrnes, Jr. ................ E06C 9/08 182/95
4,860,855 A 8/1989 Riley
5,575,353 A 11/1996 Cafaro
5,628,381 A 5/1997 Foster et al.
5,735,586 A * 4/1998 Cheng .................... A47B 85/08 182/35
6,425,711 B1 * 7/2002 Kiter ....................... E01D 15/24 405/218
6,929,094 B1 8/2005 Parks et al.
8,413,764 B1 4/2013 Cohen et al.
8,590,671 B2 11/2013 Potter et al.
8,602,162 B2 12/2013 Sahin et al.
8,925,686 B2 * 1/2015 Saint-Jalmes .......... B64D 11/00 244/129.6
9,004,227 B2 4/2015 Chilton
9,145,733 B2 9/2015 Jonas et al.
9,447,639 B2 9/2016 Cohen et al.
9,540,875 B2 1/2017 Ellis
9,902,577 B2 2/2018 Honeycutt et al.
11,408,225 B1 * 8/2022 Godfrey .................. E06C 1/005
11,697,965 B2 7/2023 O'Donnell et al.
11,719,042 B1 8/2023 Mackarvich
2011/0067954 A1 3/2011 Deal
2017/0022680 A1 1/2017 Whiting
2017/0260811 A1 * 9/2017 Trudeau .................. E04H 4/144

FOREIGN PATENT DOCUMENTS

CH 280767 A * 2/1952 .............. E04F 11/04
GB 2416687 A * 2/2006 ........... A47B 46/005

* cited by examiner

*Primary Examiner* — Colleen M Chavchavadze
(74) *Attorney, Agent, or Firm* — Invention To Patent Services; Alex Hobson

(57) ABSTRACT

A ladder safety system is configured to prevent falls from prematurely stepping off the ladder by providing a left-side panel and right-side panel that extends from the sides of the ladder out from a front side of the ladder. Also, the ladder safety system has step extensions from at least the first step and preferably from the first and second step that create a larger step extending out from the front side of the ladder to catch a person's foot when they step back prematurely thinking they are lower on the ladder than they actually are. Also, the left-side and right-side panel prevent a person from stepping off to the side of the ladder when they think they are lower on the ladder than they are.

20 Claims, 8 Drawing Sheets

LADDER SAFETY SYSTEM

BACKGROUND OF THE INVENTION

Field of the Invention

The invention relates to a ladder safety system that includes a left-side panel and right-side panel that open to support a step extension that extends out from the first step and optionally the second step of the ladder to support the extension in a step position.

Background

Many injuries are caused by people falling off of ladders. Studies show that approximately 30% of ladder-related injuries occur from falls while on the bottom two rungs of a ladder. This is often due to individuals underestimating the risks associated with being on the lower rungs, which may include getting on or off the ladder or experiencing instability. When a person is on the lower rungs of a ladder, they often forget which rung they are on. They may think they are on the bottom rung when actually they may be on the second or third rungs from the bottom. When a person prematurely steps off a ladder they initially fall slightly backward. As their foot misses the first or even second rung, they start to fall either directly backward or to the left or right depending on which foot is being used to dismount the ladder. This causes the person to lose their balance and the fall accelerates quickly. The same thing happens if a person tries to get off a ladder when they are on the third rung. This can be even more serious because the fall is from a higher position, and the distance of falling is greater.

SUMMARY OF THE INVENTION

A ladder safety system is configured to prevent falls from prematurely stepping off the ladder by providing a left-side panel and right-side panel that extends up along the ladder along the left rail and right rail at least along the first step and second step, wherein the first step is the first step from the base end of the ladder and the second step is the second step from the base end of the ladder. Also, the ladder safety system has step extensions from at least the first step and preferably from the first and second step that create a larger step extending out from the front side of the ladder to catch a person's foot when they step back prematurely thinking they are lower on the ladder than they actually are. Also, the left-side and right-side panel prevent a person from stepping off to the side of the ladder when they think they are lower on the ladder than they are. The side panels may prevent a person who is starting to fall or is falling from letting their foot and leg extend beyond the side rails exacerbating the fall. Instinctively, when a person's foot or leg hits the side panels, the person will realize they are bumping into something and will retract the foot or leg to a normal position.

The left-side panel and right-side panel, hereinafter panels, may be configured to pivot or rotate from a closed configuration to an open configuration, wherein the panels may be coupled to the ladder by a hinge and rotate from a closed position wherein the panels extend from a side of the ladder or a respective ladder rail over the steps of the ladder. The extended ends of the left-side panel and right-side panel may face each other in a closed position. In an open position, the panels may extend out from a front side of the ladder and may extend substantially parallel with the sides of the ladder, or within about 20 degrees or preferably within about 10 degrees of parallel with the sides of the ladder.

A step extension may couple with the left-side panel and/or right-side panel to secure the step extension in a step position, extending latterly out from the front side of the ladder and configured to support a person's foot when ascending or descending the ladder. The left-side panel and/or right-side panel may have a support receiver configured to receive a first step left extension support, or first step right extension support wherein the support receiver secures the first step extension support in a step position. Also, the support receiver may couple such that the side panel can not open further or pivot or rotate when secured to the step extension. The support receiver or extension support may have a protrusion or flange and the other may have a slot or groove to receive this protrusion or flange to lock the side panels in a rotational position and to the step extension.

A person may open the side panels and then rotate down the step extensions and lock them together by engaging the extension support in the support receiver to set up the ladder safety system for ascending and descending the ladder. To close the ladder the step extension may be rotated up to disengage the extension support from the support extension and then the side panels may be rotated to close the side panels over the step extensions.

In an exemplary embodiment, the first-step and/or second step may have a step-support guide that guides an extension support coupled to the step extension to guide the step extension and open the step extension as the side panels are opened. The step extensions, first-step, second-step or even third-step extension may each open automatically as the left-side panel and right-side panel are opened. Also, the step-support guide may extend along the interior surface of panel from a step-support guide closed end to a step-support guide open end that may have or form a support receiver, as described herein, to retain the extension support in a locked position with the panel open and with the step extension in a step position and may have a protrusion or flange or a slot or groove to prevent rotation of the panel and better secure the two safety components, the panel and step extension, together.

A ladder safety system may have left-side and right-side panels that extend at least over the first step and preferably along the second step and first step, and may also further extend up to and/or along the third step. This may be preferred as many falls occur from the second or third step. However, the left-side and right-side panels may extend along all of the steps or rungs of the ladder.

A ladder safety system may have a step extension from at least the first step and preferably from both the first step and second step but may have step extensions from successively higher steps or all the steps. In an exemplary embodiment, the ladder safety system may have only step extensions from the first step or only from the first and second steps or only the first step, second step and third step. Having panels and step extensions on too many of the steps from the base end of the ladder may make ascending the ladder and descending the ladder more complicated and may also lesson the effectiveness of the safety system. A first step extension may have an extension length that is greater than a second step extension length. In this way, if a person is on a second step and steps back thinking they are on the first step, the greater extension length of the first step will catch the person's foot as they step back from the second step extension.

A first step extension and/or second step extension may have a depth of about 10 cm or more, about 15 cm or more, 20 cm or more, 25 cm or more, and even 30 cm or more, about 35 cm or more or even 40 cm or more and any range between and including the values provided. A step extension depth that is at least 20 cm or 25 cm or more, or from about 25 cm to about 40 cm may be preferred as this may ensure the back of a person's heal will strike the step extension when they prematurely step off. A shorter step extension, such as less than 20 cm may lead to a person overstepping the extension and falling. The first step extension may have a depth greater than the depth of the second step extension by about 2.5 cm or more, about 5 cm or more, about 7.5 cm or more, 10 cm or more, 15 cm or more and any range between and including the values provided. Likewise the second step extension may have a step extension length, or depth greater than the step extension length or depth of the third step extension by about 2.5 cm or more, about 5 cm or more, about 7.5 cm or more, 10 cm or more, 15 cm or more and any range between and including the values provided. Each successive step down the ladder may have a greater step extension length or depth that is greater than the proceeding higher step by about 2.5 cm or more, about 5 cm or more, about 7.5 cm or more, 10 cm or more, 15 cm or more and any range between and including the values provided.

A ladder safety system may be a component of the ladder as sold, fixed to the ladder, or may be a detachably attachable system that can be detachably attached to a ladder and may be an accessory that is purchased separately from the ladder.

A ladder may be an extension ladder that is configured to lean against a support and may have two or more sections that can slide with respect to each other to make the extension ladder longer or may be a step ladder having a support portion that extends from a climbing portion of the ladder. This support portion may also have steps or rungs of the ladder that enables climbing up the climbing portion of the ladder or the climbing portion of the ladder.

A step extension may extend from a step or rung of the ladder that extend between the left rail and right rail of the ladder, wherein the step extension extends out from the front side of the ladder to make a step with a greater depth than the rung. Also, a step extension may be a step that rotates to extend a portion of the step out from the front side of the ladder to make a deeper step for safety.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
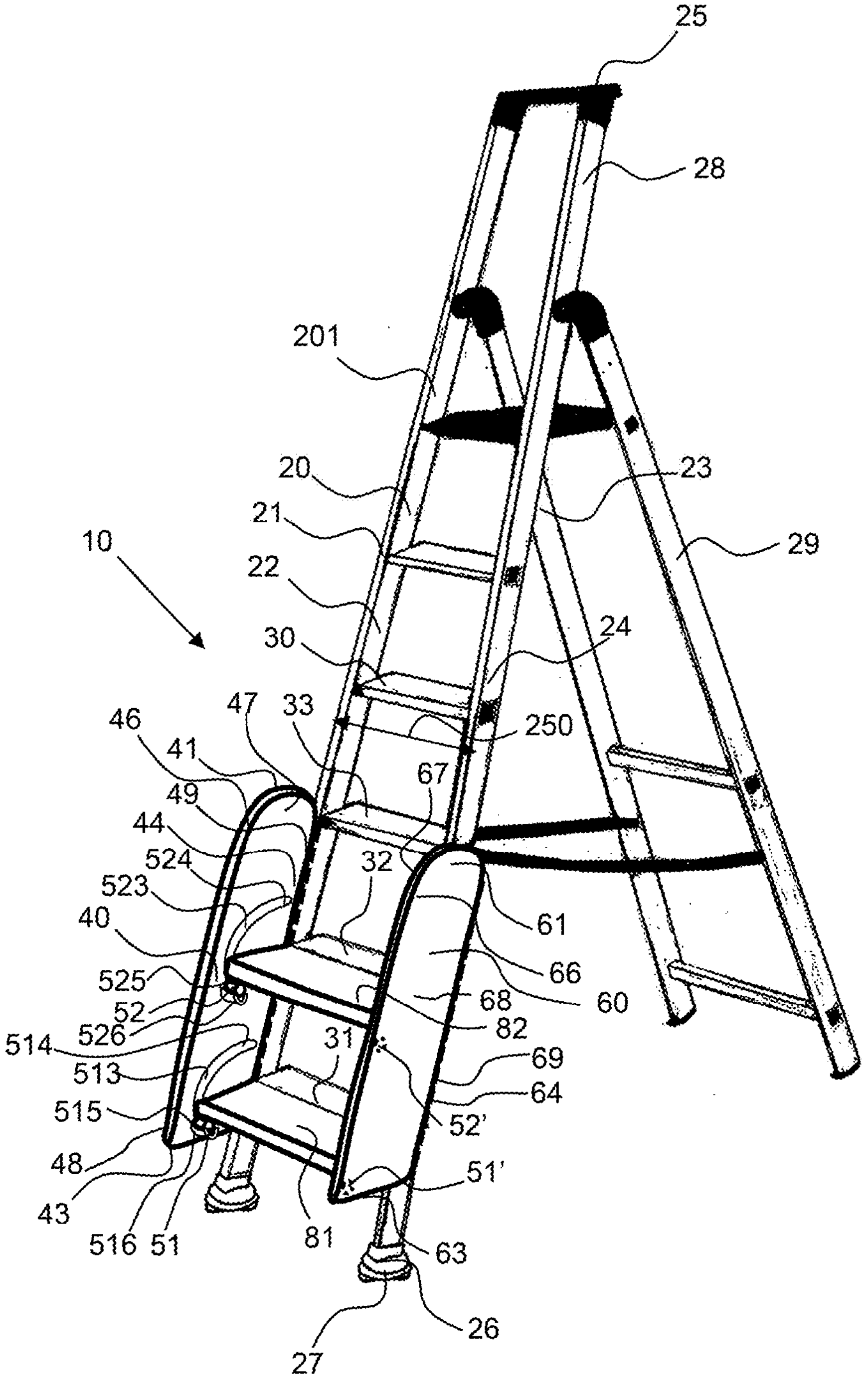
FIG. 1 shows a ladder safety system configured on ladder and in an open or extended configuration with the left-side and right-side panels extending from the side rails of the ladder and the step extensions extended to support a person climbing the ladder.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, a ladder safety system 10 is configured on ladder 20 and is in an open or extended configuration with the left-side panel 40 and right-side panel 60 extending out from the front side 21 of the ladder from the left-side rail 22 and right-side rail 24, respectively. Also, the first step 31 and second step 32 each have an extension portion, a first step extension 81 and a second step extension 82 that extend out from the left-side rail 22 and right-side rail 24. These step extensions will prevent a person from falling due to stepping back off the ladder prematurely thinking they are lower on the ladder than they actually are. People step back to step off the ladder onto the floor or ground and these extensions will catch their foot and prevent them from falling due to this premature step off. The first step 31 has a first step extension 81 and the second step 32 has a second step extension 82 that provide a wider stepping platform than the other steps 30 of the ladder 20. The ladder has a back side 23, an extension ladder portion 28 and a support portion 29 to make the ladder shown a step ladder.

The left-side panel 40 is hingeably connected to the ladder 20 such as to the left-side rail 22 of the ladder by a hinge 49 to enable the left-side panel to open and close over the steps of the ladder. The hinge may be a locking hinge, that locks in an open position and/or will stop at a fixed position when opened and will not further open. The step extensions 81, 82 are each supported in an extended position by a step-extension support 51, 52, respectively, that extends from the step to the left-side panel. The step-extension supports may be guided along the left-side panel by a step-support guides 513, 523, a race or recess along an interior surface 47 of the left-side panel 40 may extend along an arc or curve to enable the step-extension supports 51, 52 move within the step-support guide as the step or step extension rotates as the left-side panel is opened. The step-support guides 513, 523 each have a step-support guide closed end 514, 524 and a step-support guide extended end 515, 525 that secures the first step extension 81 and second step extension, respectively, in an extend position and provides support for the step or step extension. A support receiver 516 for the first step extension support 51 and support receiver 526 for the second step extension support 52 may be configured to secure the respective step extension support in position extending between the step extension and side panel. Note that a support receiver may be configured on both sides of the step extension with one the left-side panel and one on the right-side panel for each of the first step extension 81 and second step extension. A support receiver may be a channel, or recess that may have an irregular recess shape, such as a receiver flange to prevent a support flange on the step extension support from moving laterally when pressed into the support receiver.

The left-side panel 40 has a length from a top 41 to a bottom 43, closest end to the ladder feet 26 or base end of the ladder. Also, the left-side panel 40 has a width from an extended edge 46 to a coupled edge 44. The hinge 49 may extend along the coupled edge 44 and couple the left-side panel 40 to the left-side rail 22 of the ladder 20. The left-side panel 40 has an interior surface 47 that faces the ladder steps when the left-side panel 40 is in a closed configuration and an exterior surface 48, opposite the interior surface, wherein both the interior and exterior surfaces may may be planar surfaces as shown.

Likewise, the right-side panel 60 is hingeably connected to the ladder 20 such as to the right-side rail 24 of the ladder by a hinge 69 to enable the right-side panel to open and close over the steps of the ladder. The hinge may be a locking hinge, that locks in an open position and/or will stop at a fixed position when opened and will not further open. The step extensions 81, 82 are each supported in an extended position by a step-extension support 51', 52' (shown in dashed lines) that extends from the step to the right-side panel. The step-extension supports may be guided along the right-side panel by a step-support guide (not visible in FIG. 1), a race or recess along an interior surface 67 of the right-side panel 60 that may extend along an arc or curve to enable the step-extension supports 51', 52' to move within the step-support guide as the step or step extension rotates as the left-side panel is opened. The step-support guides each have a step-support guide closed end and a step-support guide extended end that secures the step in an extend position and provides support for the step or step extension. The step-support guides of the right-side panel may mirror those of the left-side panel.

The right-side panel 60 has a length from a top 61 to a bottom 63, closest end to the ladder feet 26 or base of the ladder. Also, the right-side panel 60 has a width from an extended edge 66 to a coupled edge 64. The width may be less than half of a ladder width 250 to enable the two side panels to fold toward each other but not overlap. The hinge 69 may extend along the coupled edge 64 and couple the right-side panel 60 to the right-side rail 24 of the ladder 20. The right-side panel 60 has an interior surface 67 that faces the ladder steps when the right-side panel 60 is in a closed configuration and an exterior surface 68, opposite the interior surface; both may be planar surfaces as shown.

The length of the left-side panel 40 and right-side panel 60 may be about 0.5 m or more, about 0.75 m or more, about 1 m or more, or about 2 m or more and any range between and including the length values provided.

As shown in FIG. 1, the ladder 20 has a climbing portion 201, or extension ladder portion 28 and also has a support portion 29 that extends from the climbing portion 201 to form a step ladder that is free standing. The ladder extends from a base end 27, which may have feet 26, to a top 25. The ladder may have a length from a base end 27 to a top 25 of about 2 m or more, about 2.5 m or more, about 3 m or more, about 5 m or more, or event 7 m or more and any range between and including the values provided. A longer ladder such as a ladder that is 2 m or more and even 3 m or more in length may benefit from the ladder safety system as a ladder with this length may cause people to be a disoriented or forget which step they are on when descending. A ladder may have a width 250 from a left-side to a right-side. The ladder safety system 10 may extend along or over the first step 31, second step 32 and third step 33. The system may extend up further along the ladder such as up along all of the rungs or steps.

Figure 2:
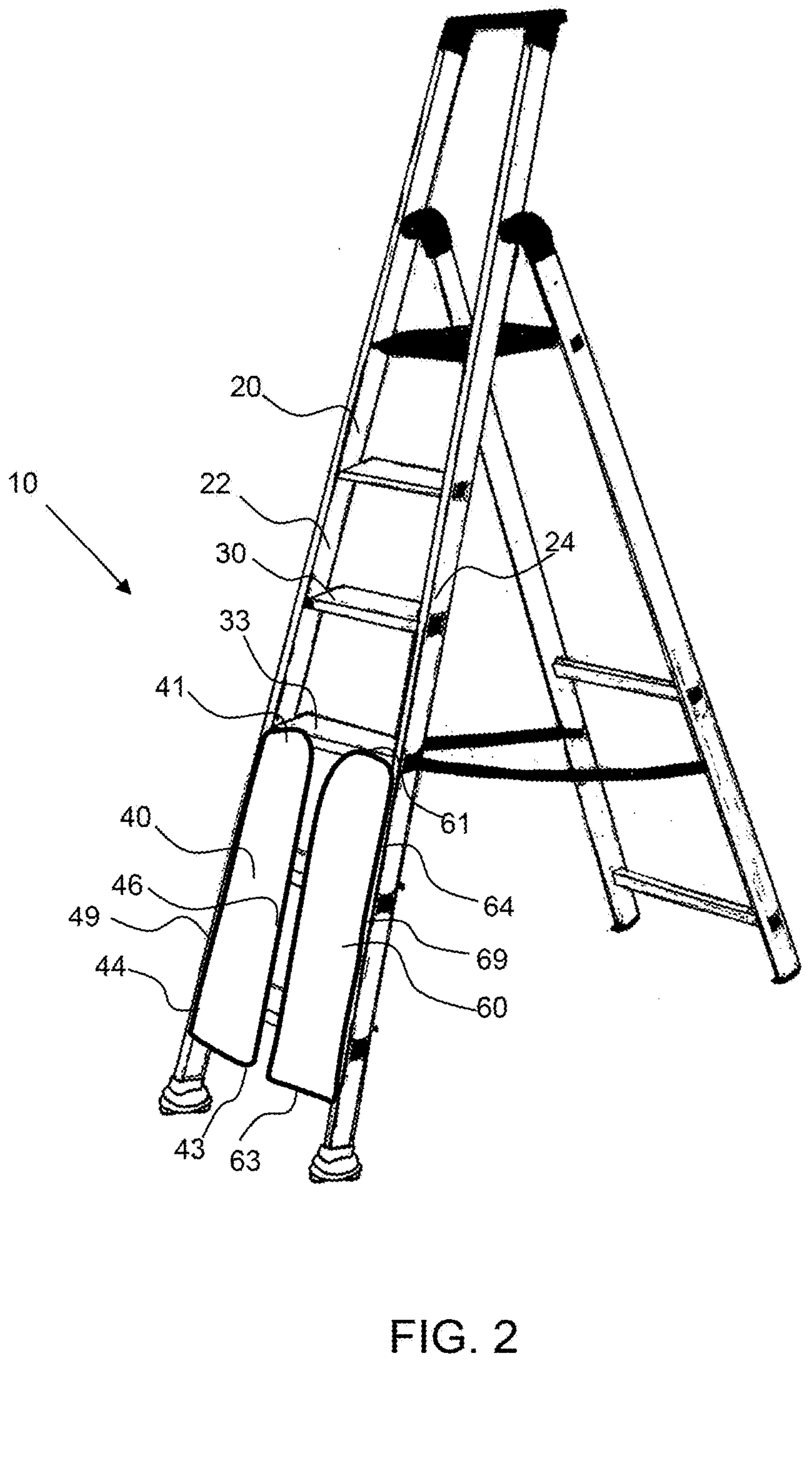
FIG. 2 shows the ladder safety system shown in FIG. 1 now in a closed configuration with the left-side panel and right-side panel closed over the steps of the ladder and the step extensions folded up under the left-side and right-side panels.

As shown in FIG. 2, the ladder safety system 10 is configured now in a closed configuration with the left-side panel 40 and the right-side panel 60 closed over the steps of the ladder and the step extensions folded up under the left-side and right-side panels.

Figure 3:
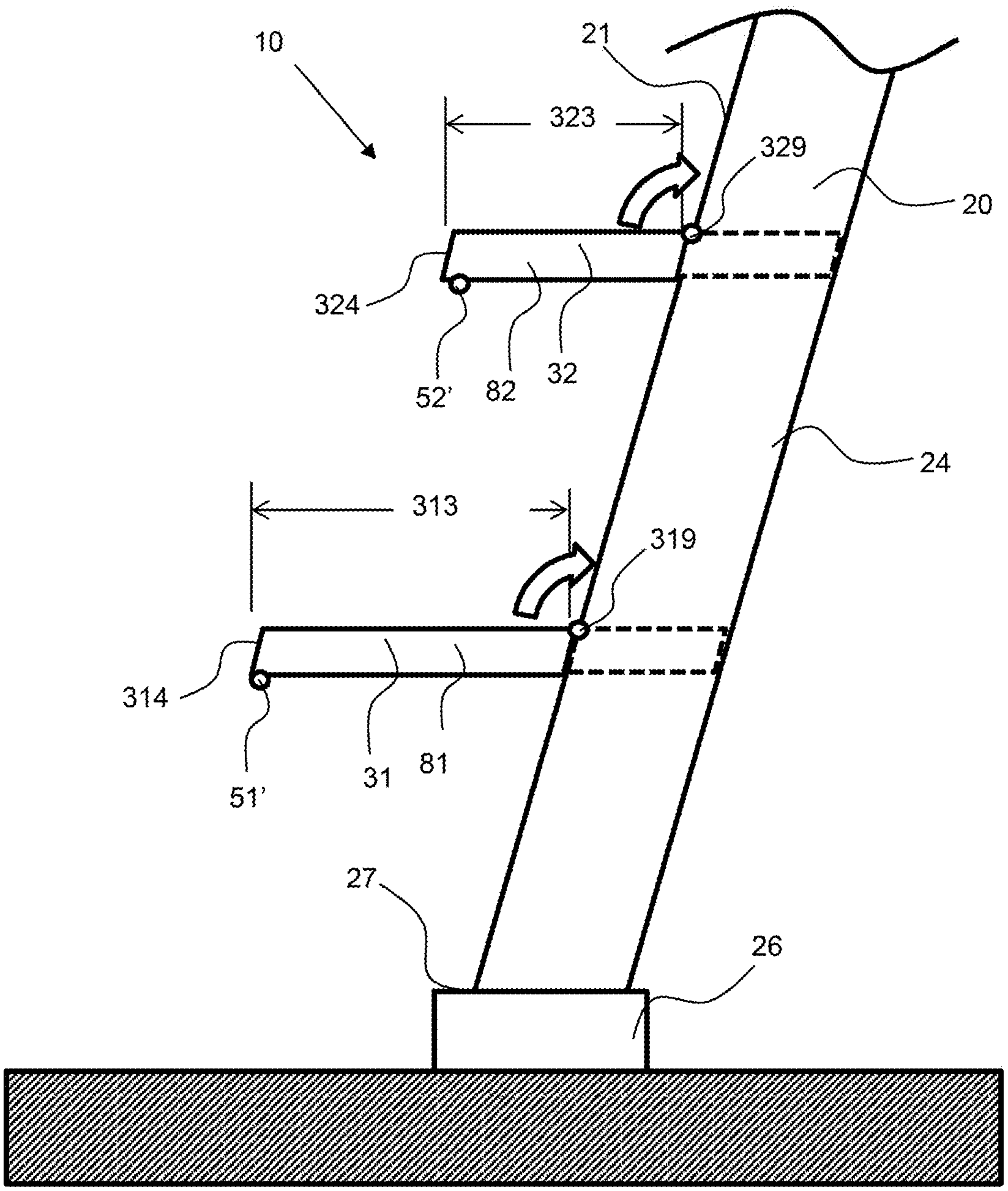
FIG. 3 shows a portion of a ladder safety system that has a first step extension and second step extension extending out from the right-side rail of the ladder, coupled to the ladder by a hinge, respectively.
Figure 4:
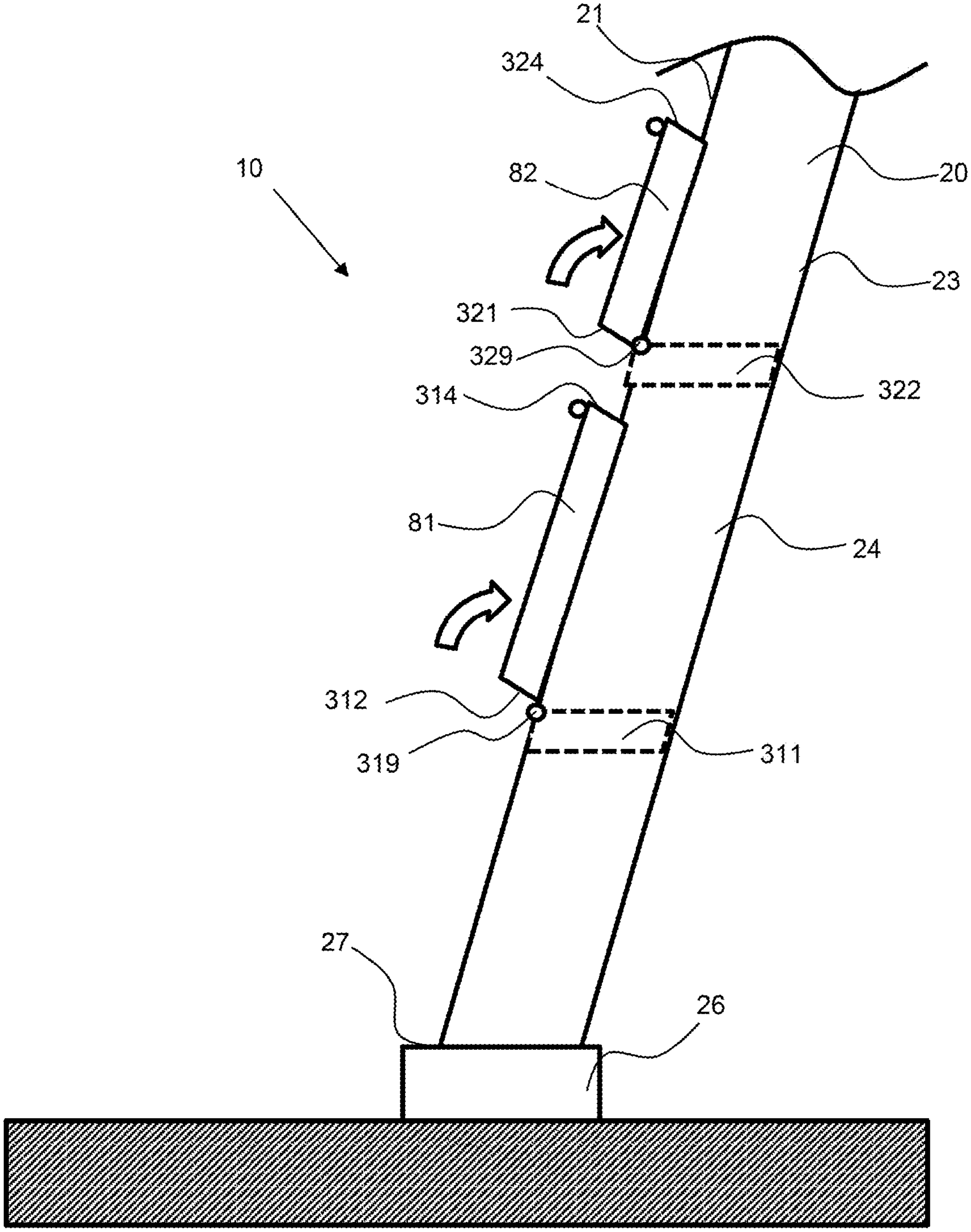
FIG. 4 shows the step extensions shown in FIG. 3, now folded up along the right-side rail of the ladder about the respective hinges.

Referring now to FIGS. 3 and 4, a ladder safety system 10 has a first step extension 81 and second step extension 82 that extend out from the right-side rail 24 of the ladder 20 and are coupled to the ladder by a hinge 319, 329 respectively. The first step extension 81 has a connected end 312 and an extended end 314 and the second step extension 82 has a connected end 321 and extended end 324. As shown, the first step extension and second step extension extend from a fixed first rung portion 311 and fixed second rung portion 322. As shown in FIG. 3, the first step extension has a first step extension length 313 from the front side 21 of the ladder, that is greater than a second step extension length 323, the extension distance of the second step from the front side 21 of the ladder to the extended end 324 of the second step extension. A first step extension and/or second step extension may have a depth of about 10 cm or more, about 15 cm or more, 20 cm or more, 25 cm or more, and even 30 cm or more, about 35 cm or more or even 40 cm or more and any range between and including the values provided. A step extension depth that is at least 20 cm or 25 cm or more, or from about 25 cm to about 40 cm may be preferred as this may ensure the back of a person's heal will strike the step extension when they prematurely step off. A shorter step extension, such as less than 20 cm may lead to a person overstepping the extension and falling. The first step extension may have a depth greater than the depth of the second step extension by about 2.5 cm or more, about 5 cm or more, about 7.5 cm or more, 10 cm or more, 15 cm or more and any range between and including the values provided.

The first step left extension support 51' and second step left extension support 52' are shown coupled to the bottom of the respective first and second step extensions and are configured proximal to the respective extended ends 314, 324.

As shown in FIG. 4, the step extensions are folded up along the right-side rail 24 of the ladder 20, about the respective hinges. The right-side and left-side panels are not shown for ease of illustration.

Figure 5:
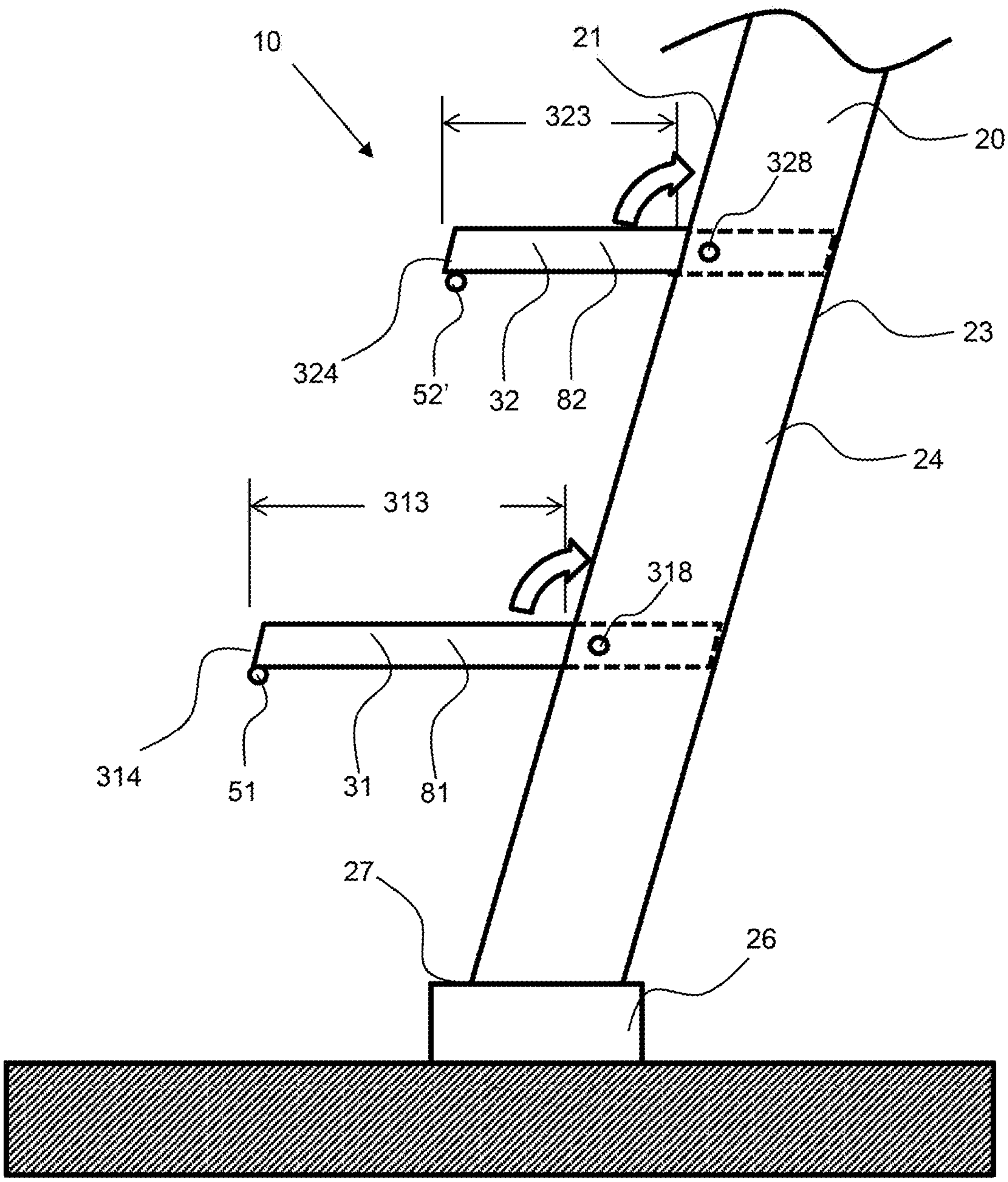
FIG. 5 shows a ladder safety system with a first step extension and second step extension that pivot to form the first step extension and second step extension.
Figure 6:
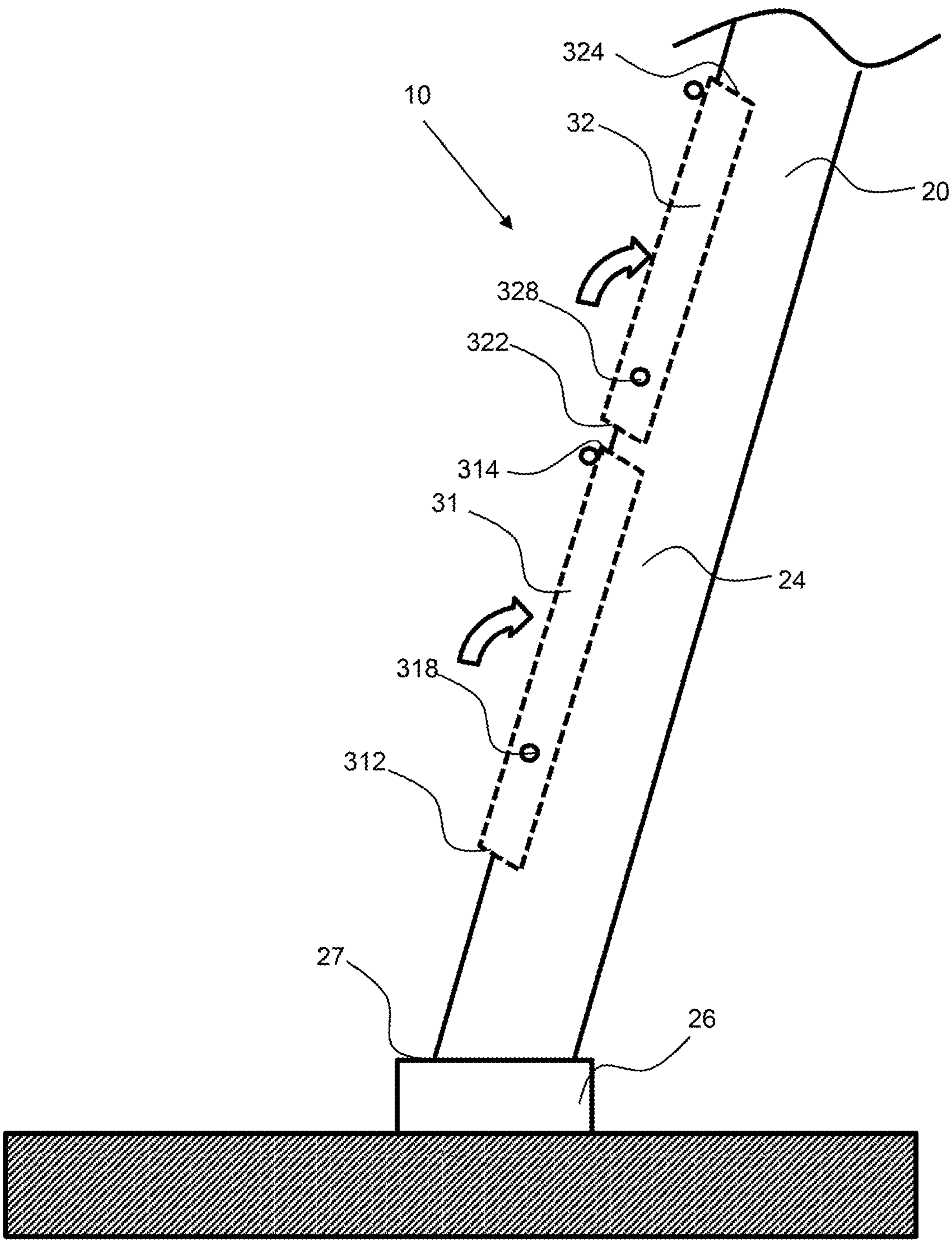
FIG. 6 shows the first step extension and second steps extensions shown in FIG. 5, now folded up along the right-side rail of the ladder.

Referring now to FIGS. 5 and 6, a ladder safety system 10 has a first step 31 that forms a first step extension 81 and second step 32 that forms a second step extension 82, wherein both step extensions extend out from the front side 21 of the ladder 20, from the right-side rail 24 of the ladder 20, and are coupled to the ladder by a hinge first step pivot 318 and second step pivot 328, respectively. As shown in FIG. 5, the first step extension has a first step extension length 313 that is greater than a second step extension length 323.

As shown in FIG. 6, the first step 31 and second step 32 are folded up along the right-side rail 24 of the ladder 20. The right-side and left-side panels are not shown for ease of illustration.

Figure 7:
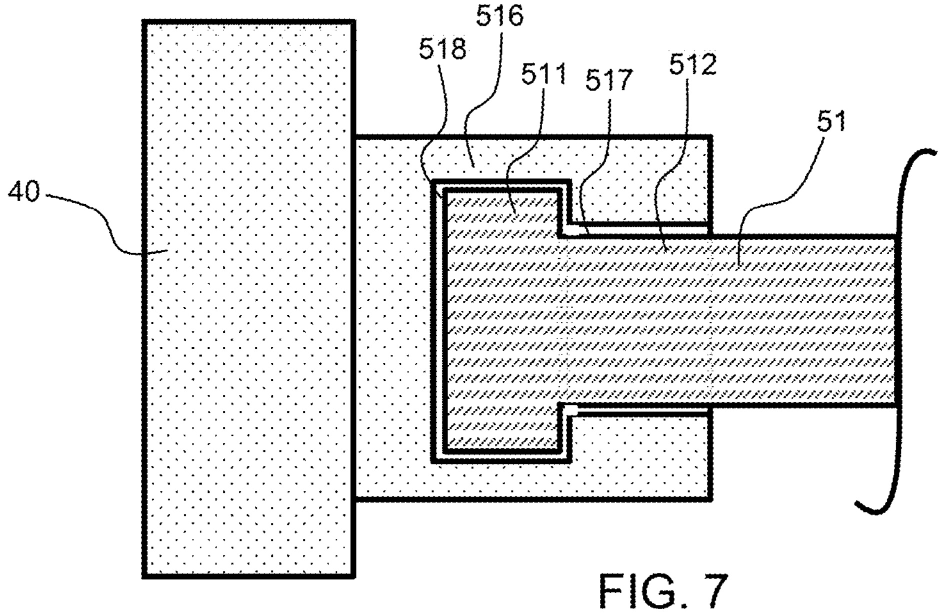
FIG. 7 shows a top view of step-extension support secured in a support receiver, wherein the step-extension support has a support flange that is retained in a receiver flange of the support receiver.
Figure 8:
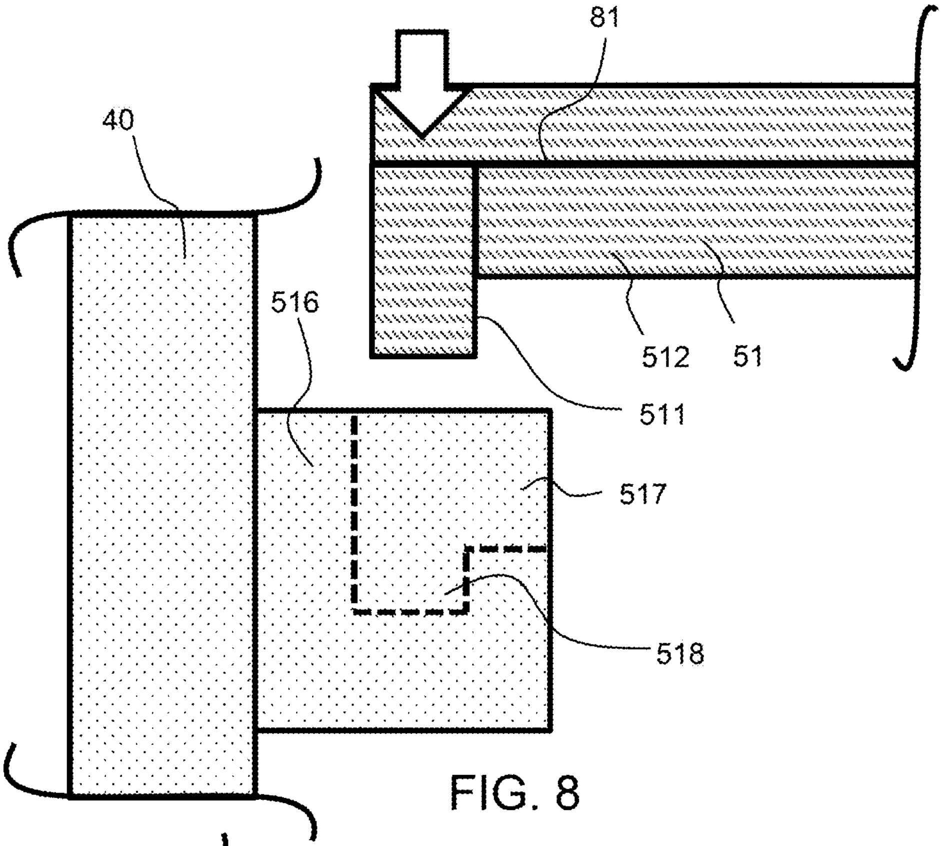
FIG. 8 shows a side view of the step-extension support extending from the bottom of the step extension and above the support receiver extending from the left-side panel, wherein the step-extension support has a support flange that is configured for insertion into a receiver flange of the support receiver.
Figure 9:
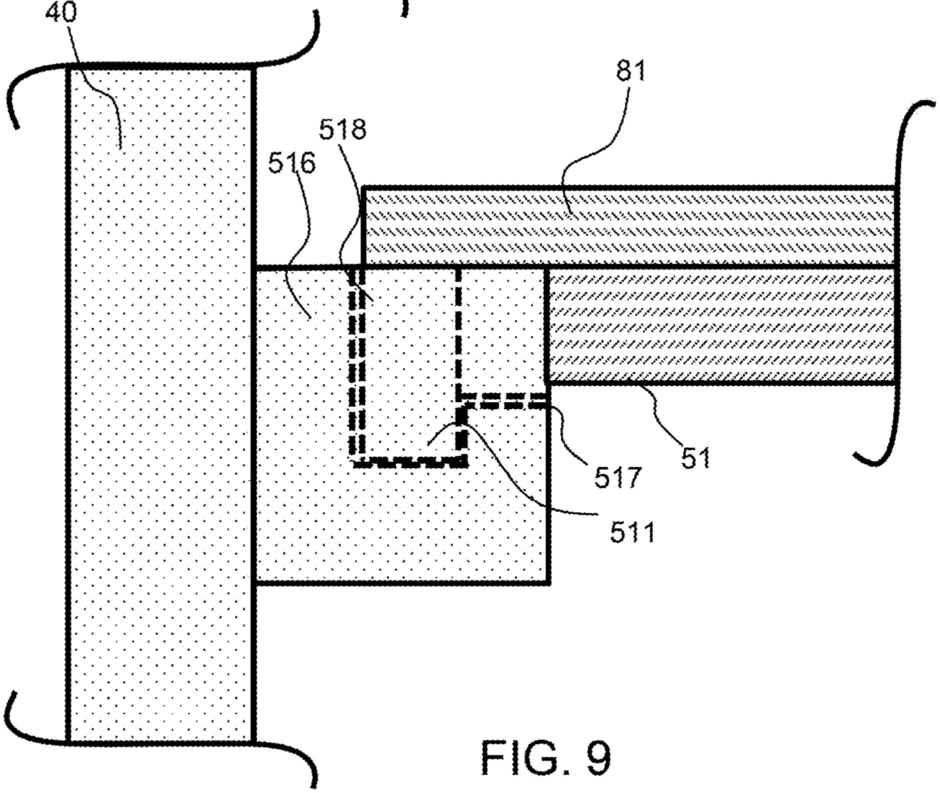
FIG. 9 shows a side view of the step-extension support secured in a support receiver shown in FIG. 7, wherein the step-extension support has a support flange that is retained in a receiver flange of the support receiver.

Referring now to FIGS. 7 to 9 a step-extension support 51 is secured in a support receiver 516, wherein the step-extension support has a support flange 511 that is retained in a receiver flange 518 of the support receiver. A support shank 512 may be coupled with the support flange wherein the support shank is smaller in dimension than the support flange that extend outward, such as radially outward from the support shank. Note that the support shank 512 may extend all the way across the step from a left side to a right side and this may provide additional support for the step. A support shank may be a metal or rigid extension that extends under the step extension 81. Also, the support receiver may have a receiver recess 517 that corresponds with the shape of the support receiver wherein the receiver recess is enlarged in the receiver flange 518 to receiver the support flange 511. This geometry prevents the side panel, such as the left-side panel 40 from being pulled or rotated away from the step extension, such as the first step extension 81, as shown.

As shown in FIG. 8, the step extension 81 is configured above the support receiver 516 that extends out from the left-side panel 40. The bold arrow indicates that the step extension is moved down to engage the step-extension support 51 into the receiver recess 517 of the support receiver 516. As shown in FIG. 9, the step-extension support 51 is retained in the receiver recess 517 of the support receiver 516 with the support flange 511 retained in the receiver flange 518 to prevent the left-side panel 40 from pivoting or rotating and positively engages or secures the step extension with the side panel.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A ladder safety system comprising:
a) a ladder comprising
  i) a left rail;
  ii) a right rail;
  iii) base end of said ladder;
  iv) a front side;
  v) steps extending between the left rail and right rail, said steps including a first step and a second step, wherein the first step is most proximal to the base end of said ladder;
wherein the first step has a first step extension that extends out a front side of said ladder beyond the left rail and the right rail when in a step configuration;
b) a left-side panel comprising:
  i) an interior surface;
  ii) an exterior surface;
  iii) a length from a top to a bottom that spans over the first and second steps of the ladder;
  iv) a width from a coupled end, coupled to the ladder, to an extended end;
c) a right-side panel comprising:
  i) an interior surface;
  ii) an exterior surface;
  iii) a length from a top to a bottom that spans over the first and second steps of the ladder;
  iv) a width from a coupled end, coupled to the ladder, to an extended end;
d) a first step left extension support extending between the first step extension and said left-side panel when the left-side panel is in an open position;
e) a first step right extension support extending between the first step extension and said right-side panel when the right-side panel is in an open position;
wherein in an open configuration with the left-side panel and the right-side panels open and extending out from a front side of said ladder, the first step left extension support supports the first step extension in an extended position on the left-side panel, and the first step right extension support supports the first step extension in an extended position on the right-side panel.

2. The ladder safety system of claim 1, further comprising a support receiver on the right-side panel to receive the first step right extension support to detachably attach the right-side panel to the first step extension.

3. The ladder safety system of claim 1, further comprising a support receiver on the left-side panel to receive the first step left extension support to detachably attach the left-side panel to the first step extension.

4. The ladder safety system of claim 3, further comprising a support receiver on the right-side panel to receive the first step right extension support to detachably attach the right-side panel to the first step extension.

5. The ladder safety system of claim 4, wherein each of the support receivers of the right-side panel and the left-side panel has a receiver recess with a receiver flange configured to receive a support flange of the respective first step right extension support and the first step left extension support to prevent rotation of the right-side panel and the left-side panel.

6. The ladder safety system of claim 5, wherein the first step right extension support and the first step left extension support are coupled together to extend from said left-side panel to said right-side panel.

7. The ladder safety system of claim 4, wherein the first step extension has an extension length of at least 10 cm.

8. The ladder safety system of claim 4, wherein the first step extension has an extension length of at least 15 cm.

9. The ladder safety system of claim 7, wherein as the left-side panel and right-side panel are opened the first step extension is extended to a step position, extending latterly out from the front side of the ladder, to support a person climbing said ladder.

10. The ladder safety system of claim 7, wherein the second step has a second step extension that extends out a front side of said ladder beyond the left rail and the right rail when the second step is in a step position.

11. The ladder safety system of claim 10, further comprising:

a) a second step left extension support extending between the second step extension and said left-side panel when the left-side panel is in an open position; and b) a second step right extension support extending between the second step extension and said right-side panel when the right-side panel is in an open position; and wherein in an open configuration with the left-side panel and the right-side panels open and extending out from a front side of said ladder, the second step left extension support supports the second step extension in an extended step position on the left-side panel, and the second step right extension support supports the second step extension in an extended step position on the right-side panel.

12. The ladder safety system of claim 11, further comprising a second support receiver on the right-side panel to receive the second step right extension support to detachably attach the right-side panel to the second step extension.

13. The ladder safety system of claim 12, further comprising a second support receiver on the left-side panel configured to receive the second step left extension support to detachably attach the left-side panel to the second step extension.

14. The ladder safety system of claim 13, wherein each of the second support receivers of the right-side panel and the left-side panel has a receiver recess with a receiver flange configured to receive a support flange of the respective second step right extension support and the second step left extension support to prevent rotation of the right-side panel and the left-side panel.

15. The ladder safety system of claim 14, wherein the second step right extension support and the second step left extension support are coupled together to extend from said left-side panel to said right-side panel.

16. The ladder safety system of claim 11, wherein the second step extension has an extension length of at least 10 cm.

17. The ladder safety system of claim 16, wherein the first step extension length is greater than the second step extension length by at least 5 cm.

18. The ladder safety system of claim 11, wherein the left-side panel comprises a second step-support guide extending along said interior surface of the left-side panel and wherein the second step left extension support moves within the second step-support guide as the left-side panel is opened; and wherein the right-side panel comprises a second step-support guide extending along said interior surface of the right-side panel and wherein the second step right extension support moves within the second step-support guide of the right-side panel as the right-side panel is opened.

19. The ladder safety system of claim 1, wherein the left-side panel comprises a first step-support guide extending along said interior surface of the left-side panel and wherein the first step left extension support moves within the first step-support guide as the left-side panel is opened; and wherein the right-side panel comprises a first step-support guide extending along said interior surface of the right-side panel and wherein the first step right extension support moves within the first step-support guide of the right-side panel as the right-side panel is opened.

20. A ladder safety system comprising:

a) a ladder comprising
   i) a left rail;
   ii) a right rail;
   iii) base end of said ladder;
   iv) a front side;
   v) steps extending between the left rail and right rail, said steps including a first step and a second step, wherein the first step is most proximal to the base end of said ladder;

wherein the first step has a first step extension that extends out a front side of said ladder beyond the left rail and the right rail when in a step configuration;

b) a left-side panel comprising:
   i) an interior surface;
   ii) an exterior surface;
   iii) a length from a top to a bottom that spans over the first and second steps of the ladder;
   iv) a width from a coupled end, coupled to the ladder, to an extended end;

c) a right-side panel comprising:
   i) an interior surface;
   ii) an exterior surface;
   iii) a length from a top to a bottom that spans over the first and second steps of the ladder;
   iv) a width from a coupled end, coupled to the ladder, to an extended end;

d) a first step left extension support extending between the first step extension and said left-side panel when the left-side panel is in an open position;

e) a first step right extension support extending between the first step extension and said right-side panel when the right-side panel is in an open position;

wherein in an open configuration with the left-side panel and the right-side panels open and extending out from a front side of said ladder, the first step left extension support supports the first step extension in an extended position on the left-side panel, and the first step right extension support supports the first step extension in an extended position on the right-side panel; and wherein the second step has a second step extension that extends out said front side of said ladder beyond the left rail and the right rail when the second step is in a step position; and f) a second step left extension support extending between the second step extension and said left-side panel when the left-side panel is in an open position; and g) a second step right extension support extending between the second step extension and said right-side panel when the right-side panel is in an open position; and wherein in an open configuration with the left-side panel and the right-side panels open and extending out from a front side of said ladder, the second step left extension support supports the second step extension in an extended step position on the left-side panel, and the second step right extension support supports the second step extension in an extended step position on the right-side panel.

* * * * *